(12) United States Patent
Garg et al.

(10) Patent No.: US 7,218,709 B2
(45) Date of Patent: *May 15, 2007

(54) INTELLIGENT VOICEMAIL MESSAGE WAITING SYSTEM AND METHOD

(75) Inventors: Amit Garg, Howell, NJ (US); Rajeev B. Patil, Holmdel, NJ (US); Jeffrey L. Tuttle, Hazlet, NJ (US)

(73) Assignee: AT&T Corp., New York, NY (US)

( * ) Notice: Subject to any disclaimer, the term of this patent is extended or adjusted under 35 U.S.C. 154(b) by 90 days.

This patent is subject to a terminal disclaimer.

(21) Appl. No.: 10/743,990

(22) Filed: Dec. 22, 2003

(65) Prior Publication Data

US 2004/0136505 A1 Jul. 15, 2004

Related U.S. Application Data

(62) Division of application No. 10/207,413, filed on Jul. 29, 2002, now abandoned.

(51) Int. Cl.
*H04M 1/56* (2006.01)
*H04M 1/64* (2006.01)
*H04M 15/06* (2006.01)

(52) U.S. Cl. .............................. 379/88.12; 379/142.04; 379/142.08; 379/142.09

(58) Field of Classification Search .............. 379/88.12, 379/201.01
See application file for complete search history.

(56) References Cited

U.S. PATENT DOCUMENTS

| | | | | |
|---|---|---|---|---|
| 5,664,008 A | * | 9/1997 | Bossi et al. ............... | 379/88.12 |
| 5,748,709 A | * | 5/1998 | Sheerin .................... | 379/88.22 |
| 5,751,793 A | * | 5/1998 | Davies et al. ............ | 379/88.11 |
| 5,825,852 A | | 10/1998 | DePond et al. | |
| 5,995,594 A | * | 11/1999 | Shaffer et al. ........... | 379/88.12 |
| 6,032,039 A | * | 2/2000 | Kaplan ....................... | 455/413 |
| 6,208,731 B1 | | 3/2001 | DePond et al. | |
| 6,215,859 B1 | * | 4/2001 | Hanson .................... | 379/88.12 |
| 6,396,513 B1 | * | 5/2002 | Helfman et al. ............ | 715/752 |
| 6,529,500 B1 | * | 3/2003 | Pandharipande ............ | 370/352 |
| 6,539,079 B1 | * | 3/2003 | Crockett et al. ......... | 379/88.12 |
| 6,643,356 B1 | * | 11/2003 | Hickey et al. ........... | 379/88.12 |
| 6,665,379 B1 | * | 12/2003 | Brown et al. ............. | 379/88.18 |
| 7,010,100 B1 | * | 3/2006 | Garg et al. ............... | 379/88.12 |
| 7,020,250 B2 | * | 3/2006 | Lew et al. ................ | 379/88.12 |
| 2002/0031211 A1 | * | 3/2002 | Fullarton et al. ....... | 379/201.01 |
| 2002/0115478 A1 | * | 8/2002 | Fujisawa et al. ............ | 455/567 |

OTHER PUBLICATIONS

Pending U.S. Appl. No. 10/743,987 by Garg et al filed on Dec. 22, 2003.*

* cited by examiner

*Primary Examiner*—Fan Tsang
*Assistant Examiner*—Lisa Hashem

(57) ABSTRACT

An intelligent voice message status indication device for a single line of a telephone network includes a controller that responds to caller-ID signals to detect whether a mailbox contains a message, responds to a call-waiting signal to break communication with the voicemail system during message retrieval to capture an incoming call, and toggles multiple indicators associated with respective sub-mailboxes on a single line. The message waiting indicators may include respective unique audio, as well as respective unique, visual indication of message presence in one or more mailboxes. The voicemail servers of the network may be correspondingly partitioned to host multiple mailboxes and to provide unique outbound caller IDs to identify a mailbox having a message.

2 Claims, 6 Drawing Sheets

INTELLIGENT VOICEMAIL MESSAGE WAITING SYSTEM AND METHOD

CROSS-REFERENCE TO RELATED APPLICATION

This application is a division of U.S. application Ser. No. 10/207,413, filed Jul. 29, 2002 now abandoned.

BACKGROUND

This invention relates to voicemail, but more specifically to a method and an apparatus that provides intelligent voicemail notification Subscribers of voicemail services typically receive visual notifications of message waiting, often in the form of a flashing LED indicator (i.e., visual voicemail waiting indicator (VMWI)) that is integrated with the subscriber's customer premise equipment (CPE), e.g., a telephone device. A message notification server of the local exchange or voicemail service provider toggles the CPE's indicator on and off according to the receipt or presence of new messages. Visual indicators provide an indication of messages to the extent line-of-sight observation permits the subscriber's visual detection.

In a prior art system shown in FIG. 1A, a circuit-switched telephone network 2 includes a voicemail server 3 that stores voicemail messages and a message notification server 4 that interacts with a subscriber's CPE 5 to indicate the presence of a new message received form, for example, an incoming call at CPE 7. Each line or telephone number of CPE 5 generally has one associated mailbox and one partition in the voicemail server 3 that stores audio messages associated with the telephone line. In order to start a message check procedure 10 in a service that includes call waiting, as depicted in FIG. 1B, a controller 6 of the subscriber's CPE 5 typically disables the call waiting function when accessing voicemail to retrieve message status. At step 14, the CPE 5 dials the message notification server 4 to obtain an indication of recorded messages. During a check at step 16, a "busy" signal transmitted by the message notification server 4 indicates that voicemail server 3 has no new message whereupon the procedure effects a return to a start state 17.

If the check at step 16 does not render a busy signal, a next step 18 includes detecting whether the message notification server 4 rings but does not answer the call of CPE 5. This indicates the presence of a new message to CPE 5, which turns ON an LED to indicate a new message.

In addition, if the message notification server 4 has an update for the message status indication for a mailbox and the corresponding CPE 5 does not call the message notification server 4 within a pre-specified amount of time, say five to eight minutes, the message notification server 4, at step 20, rings back CPE 5 and hangs up. The ringback and hanging up signals prompt CPE 5 to again call the message notification server 4 to invoke a procedure to obtain messages from the voicemail server 4, as indicated by steps 10 through 18.

In a conventional telephone network providing both voicemail and call waiting, certain incoming calls to a subscriber at CPE 5 may be missed or delayed during message checking. The CPE's disabling of the call-waiting feature when placing an outbound call to the server 4 to check message status causes an immediate transfer to voicemail of a caller's incoming call. In such a scenario, neither the subscriber at CPE 5 will have knowledge of the incoming call nor will the subscriber's call-waiting or caller ID service detect the incoming call. If the incoming caller were to record a message after being immediately directed to voicemail, the subscriber at CPE 5 may not receive notification of the new message until after CPE 5 completes the message status check, which may take eight to nine minutes. If the subscriber were to place another outbound call within a three or four minute period of the incoming call, the subscriber will not receive the indication for a new message until after completing the outbound call and hanging up. Accordingly, substantial delays may be encountered in prior systems that disable call waiting during message status check.

SUMMARY

In accordance with a first aspect of the present invention, there is provided a voice message waiting indication device for a single line of a telephone network that includes a message notification server to provide message notification and a voicemail server to store messages where the voicemail server has multiple mailboxes and associated identification numbers that identify respective ones of the multiple mailboxes. In a preferred embodiment, the voice message waiting indication device comprises respective indicators associated with respective mailboxes, a detector to detect an identification number associated with the respective mailboxes, and a message indication controller responsive to the detector to activate a respective one of the indicators identified by a unique identification number of a mailbox or sub-mailbox having a voicemail message.

In accordance with another aspect of the invention, a message waiting indication device interfaces with a voicemail system that stores voicemail messages and that sends a message presence notification. The device comprises a message indicator that indicates message presence and a message indication controller that obtains information from the voicemail system indicative of a new message where the controller responds to an incoming call during message status check to break communication with the voicemail system during message status check and to go on-hook to receive the incoming call.

In another aspect of the invention, a message waiting indication device includes an indicator capable of being toggled to indicate presence or absence of a message of said voicemail server, and a message indication controller responsive to a unique identification of a ring-back or busy signal from the network to determine the message status.

In yet a further aspect of the invention an improvement of a telephone network having a voicemail server that stores messages and a message notification server that notifies a subscriber device of a message stored in the voicemail server by initiating a ring-back signal comprises multiple mailbox partitions associated with a single telephone line of the network, respective unique IDs associated with respective ones of the mailbox partitions, and a controller that stores a voicemail message in a partition associated with one of the unique IDs and that effects transmission of a voicemail message status stored in a partition associated with one of the unique IDs.

A further aspect of the invention comprises a controller of a message notification server that automatically effects a call to a subscriber device in response to receipt of a new message, or otherwise in response to a change in message status, and/or a lapse of a predetermined period of time since receipt of a prior call from the subscriber's CPE device.

Another aspect of the invention includes a CPE device utilizing a controller responsive to a caller-ID signal (on either an incoming call or on an incoming call-waiting call) of a message notification server to ascertain the presence or absence of a new message.

In yet a further aspect of the invention, a voice messaging server includes multiple mailboxes and associated outbound telephone numbers or other unique identification that is detected by a CPE to determine which of plural corresponding message presence indicators should be toggled, thereby providing voicemail notification on a per-mailbox basis for a single telephone line.

A further aspect of the invention includes a CPE device and method utilizing a controller or a procedure thereof responsive to a call-waiting or an in-band signal to effect termination of message status check and capturing of an incoming call thereby preventing sending the incoming call to voicemail.

A yet further aspect of the present invention includes, in one embodiment, an intelligent audio visual message waiting indicator (IAVMWI) providing both audio and visual indication of a new message.

These and other aspects of the invention will become apparent upon review of the succeeding disclosure taken in connection with the accompanying drawings. The invention, though, is pointed out by the appended claims.

DESCRIPTION OF ILLUSTRATIVE EMBODIMENTS

A brief explanation of certain modes of operation facilitates an understanding of various aspects of the invention. In a preferred embodiment of the invention, the subscriber is pre-subscribed to voicemail service and uses a CPE for Intelligent Audio Visual Message Waiting Indicator (IAVMWI). In operation, the IAVMWI calls a Message Notification Server of the telephone network to obtain voicemail status each time the subscriber goes on-hook or after pre-specified time has expired after Ring No Answer (RNA). The Message Notification Server uses a BUSY signal to indicate "no new message" and a "Ringback" to indicate the presence of a "new message". The IAVMWI will turn-OFF or turn-ON the indicator appropriately. Whenever the subscriber has voicemail (or more precisely whenever the status of voicemail changes) and the Message Notification Server has not received a call from the IAVMWI within the pre-specified time, the Message Notification Server calls the IAVMWI to convey message status update. The IAVMWI uses the "caller-id/call waiting caller-id" of the Message Notification Server to update the status of the appropriate mailbox. A first unique caller-ID may be used to indicate the presence of a "new message" and a second unique caller-ID may be used to indicate "no new message".

Multiple sub-mailboxes can also be supported using unique caller-IDs to terminate the call on the Message Notification Server for each sub-mailbox and for message status updates from the Message Notification Server to the IAVMWI. The IAVMWI may also support audio and visual alerts. If the subscriber has call waiting, when the IAVMWI is calling the Message Notification Server to obtain voicemail status, the incoming call will effect a termination of the status check (after determining message status) and the line going on-hook, which causes the CPE to ring as a result of the incoming call. This permits the subscriber to capture the incoming call that is otherwise missed.

Figure 1A:
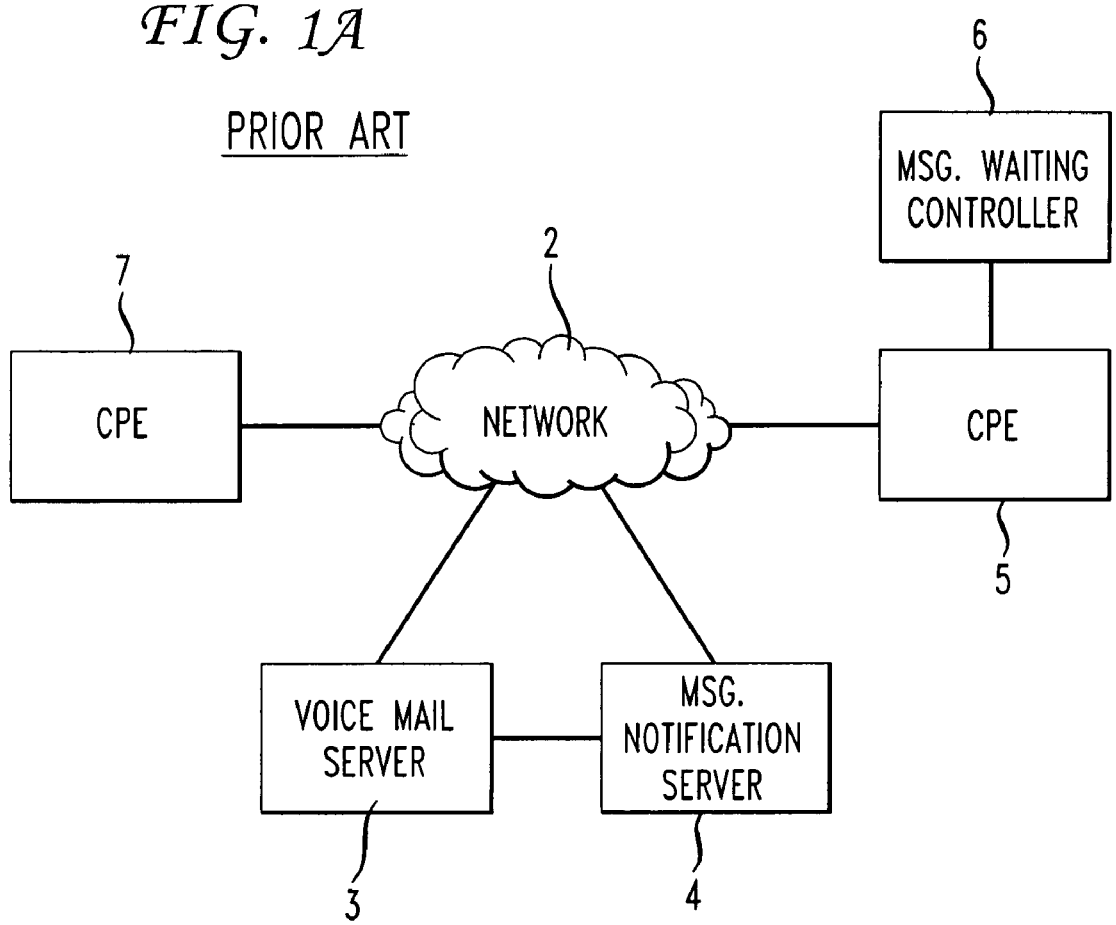
FIG. 1A shows a telephone network having a conventional voicemail server and notification server in accordance with the prior art.
Figure 1B:
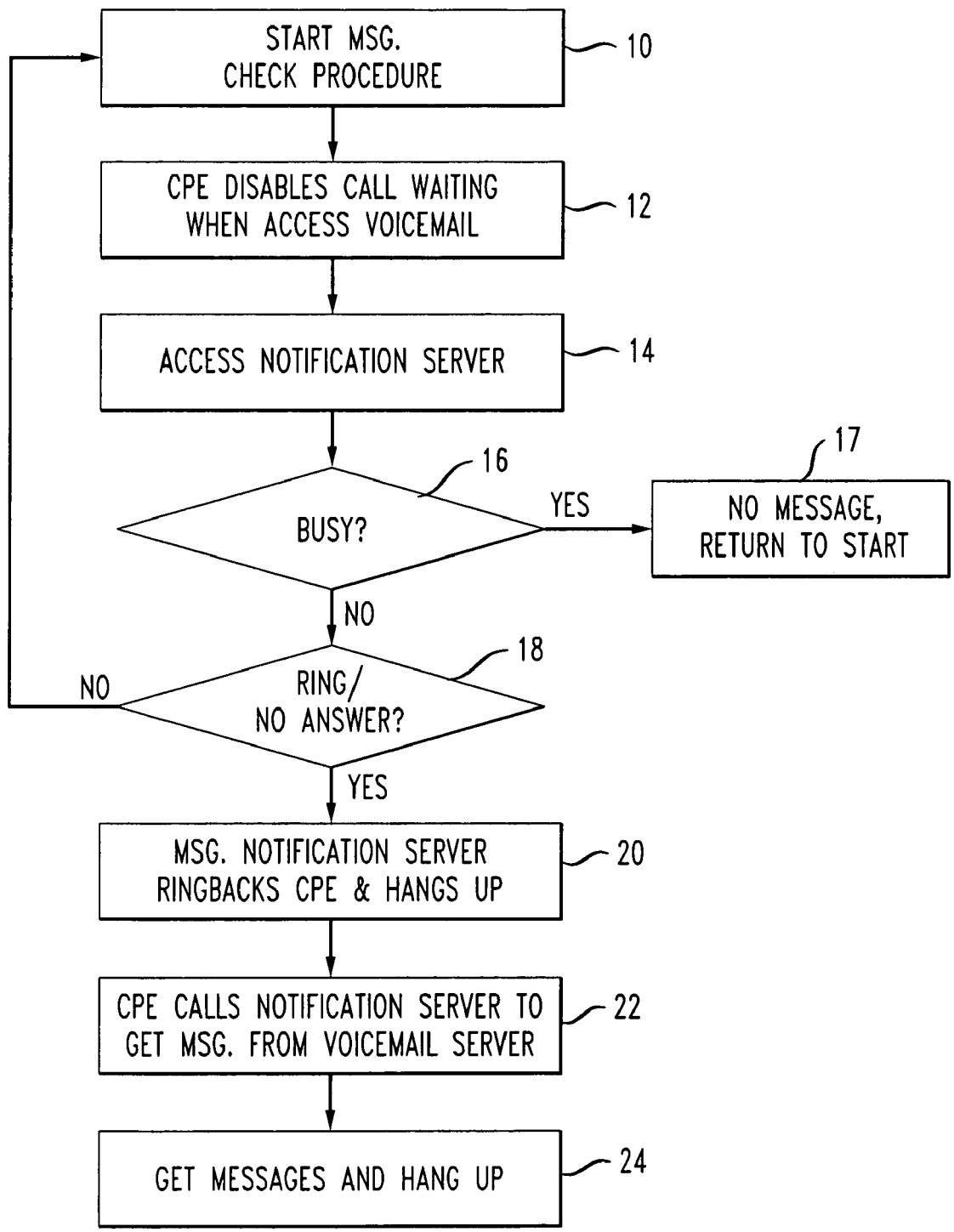
FIG. 1B illustrates a voicemail checking and message status check procedure according to the prior art.
Figure 2:
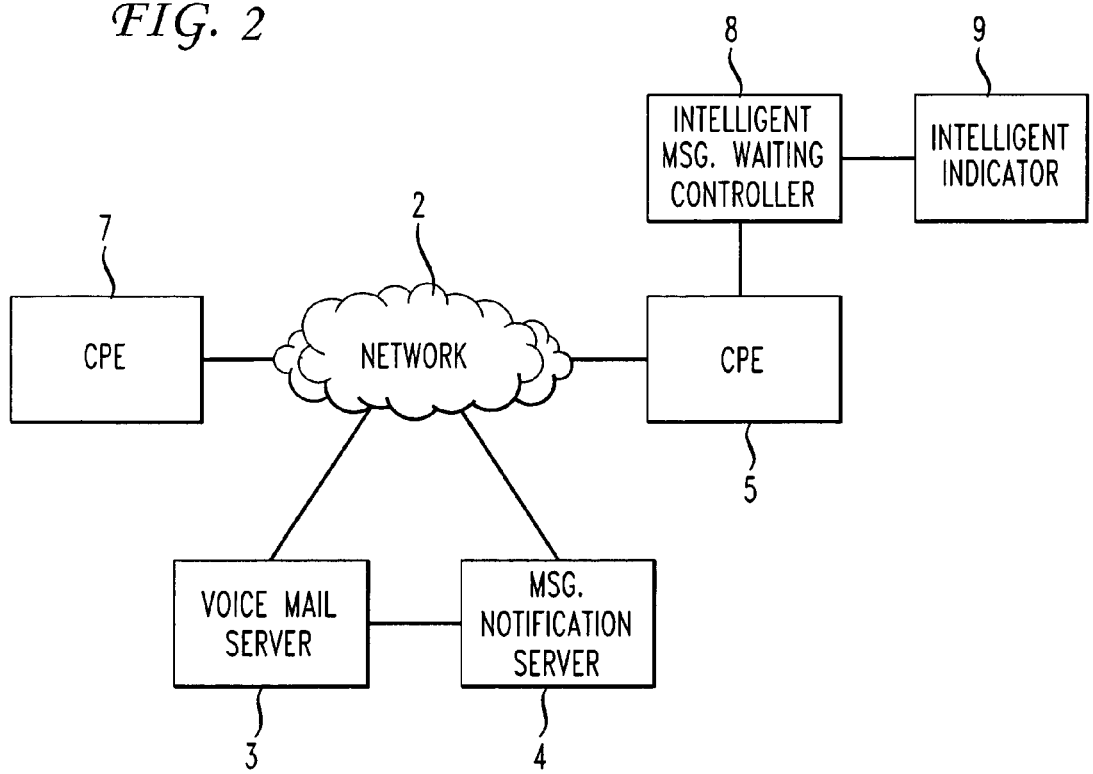
FIG. 2 illustrates a telephone network having an intelligent voicemail checking and retrieval system according to an aspect of the present invention.

FIG. 2 illustrates a voicemail system of a telephone network according to the aforementioned aspect of the invention. On the network side, the system includes a local exchange or other type of network 2 having a voicemail server 3 and a message notification server 4. In a preferred embodiment, the message notification server 4 has an assigned network ID, e.g., a telephone number, associated with the subscriber's mailbox, which is contained in a partition of voicemail server 3. The network ID is used by the subscriber's CPE 5 to detect a call being made by the notification server 4 in order to permit toggling of a new message indicator, as subsequently explained. Preferably, server 4 calls CPE 5 only when the message status changes either from no new message to new message, or vice versa.

According to another embodiment of the invention, voicemail server 3 may be partitioned to host multiple sub-mailboxes associated with a single telephone line. In this case, separate network IDs or telephone numbers are assigned to the respective mailboxes so that, when server 4 calls CPE 5, an intelligent controller 8 thereof knows which sub-mailbox has a new message and which of multiple corresponding indicators should be toggled. Although shown as separate network elements, audio storage and message notification functions of severs 3 and 4 may be also performed by a single platform.

On the subscriber's side of the intelligent voicemail message waiting indication system, an intelligent message waiting controller 8 of CPE 5 controls an intelligent indicator 9 which, according to a feature of the present invention, may include an audio and/or a visual indication of message waiting or the presence of a new message. Intelligent controller 8 preferably calls the message notification server to obtain voicemail status each time the subscriber goes "on-hook." Alternatively or in addition, controller 8 may place an outbound call to server 4 after a pre-specified time period after a "ring and no answer" (RNA). In addition, indicator 9 may include plural audio and/or visual indicators respectively associated with sub-mailboxes on voicemail server 3. In the plural sub-mailbox embodiment, controller 8 identifies which sub-mailbox indicator should be toggled in response to detection of a specific, unique sub-mailbox-associated caller-ID or other identification code transmitted by the notification server 4.

Controller 8 also disengages communication with the voicemail servers upon detection of an incoming call to avoid immediately sending that call to voicemail. Using a call-waiting feature of the network service provider, controller 8 places CPE 5 "on-hook" in response to detecting a call-waiting incoming call.

Figure 3:
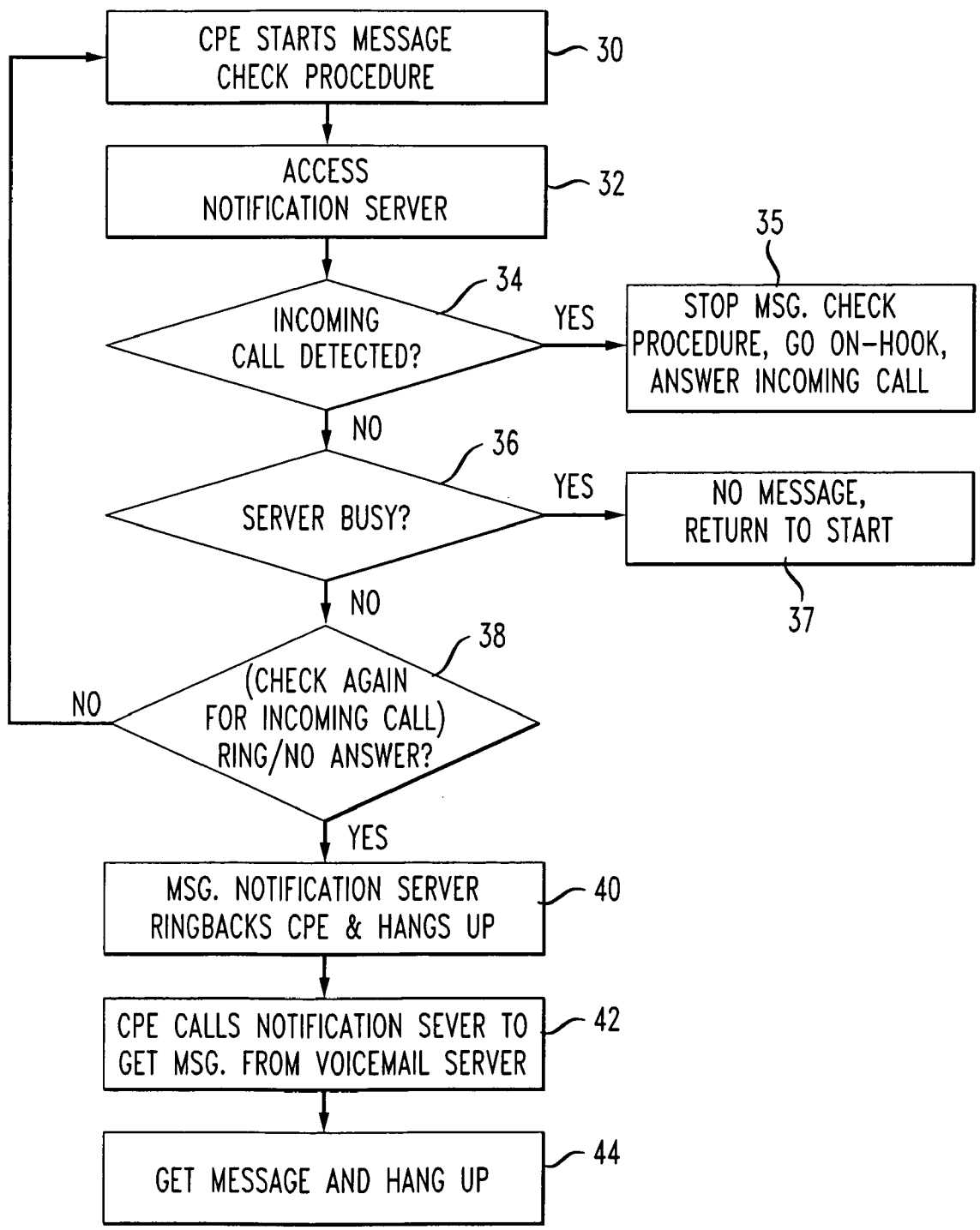
FIG. 3 illustrates the call-waiting feature implemented by the system of FIG. 2 according to an aspect of the present invention.

FIG. 3 illustrates a voicemail control method utilizing call waiting to avoid immediately sending an incoming call to voicemail during CPE 5's access to voicemail to check status. An exchange of signals between intelligent controller 8 and message notification server 4 enables the subscriber to capture incoming calls that are otherwise missed or delayed. The method begins at step 30 where a message check procedure is initiated using the subscriber's CPE device or after lapse of a predetermined time period since a previous message check. At step 32, controller 8 effects accessing the message notification server 4 by automatically initiating an outbound call to server 4. As previously indicated, server 4 has an assigned network address, e.g., a telephone number.

While dialing and/or accessing server 4, controller 8, at step 34, uses the call-waiting function of the subscriber's CPE 5 to monitor and detect incoming calls. Upon detecting an incoming call-waiting call during a message check, controller 8, at step 35, stops the message check procedure and instructs CPE 5 to hang-up, i.e., go "on-hook." This permits the subscriber to receive the incoming call that is otherwise re-routed to voicemail. If no incoming call is detected, controller 8 tests whether server 4 is busy or whether it rings, but is not answered, as indicated at steps 36 and 38. A busy signal at the access number of server 4 indicates that voicemail server 3 contains no messages or no new messages, whereupon the message check procedure is done and the system returns to a start state. The presence of new messages is indicated at step 38 by the access number of server 4 ringing but not answered.

During the tests at steps 36 and 38, controller 8 continues to monitor incoming call-waiting calls to determine whether to stop the message status check procedure and go on-hook. Preferably, the message status check process may be interrupted at any time to capture an incoming call.

Figure 4:
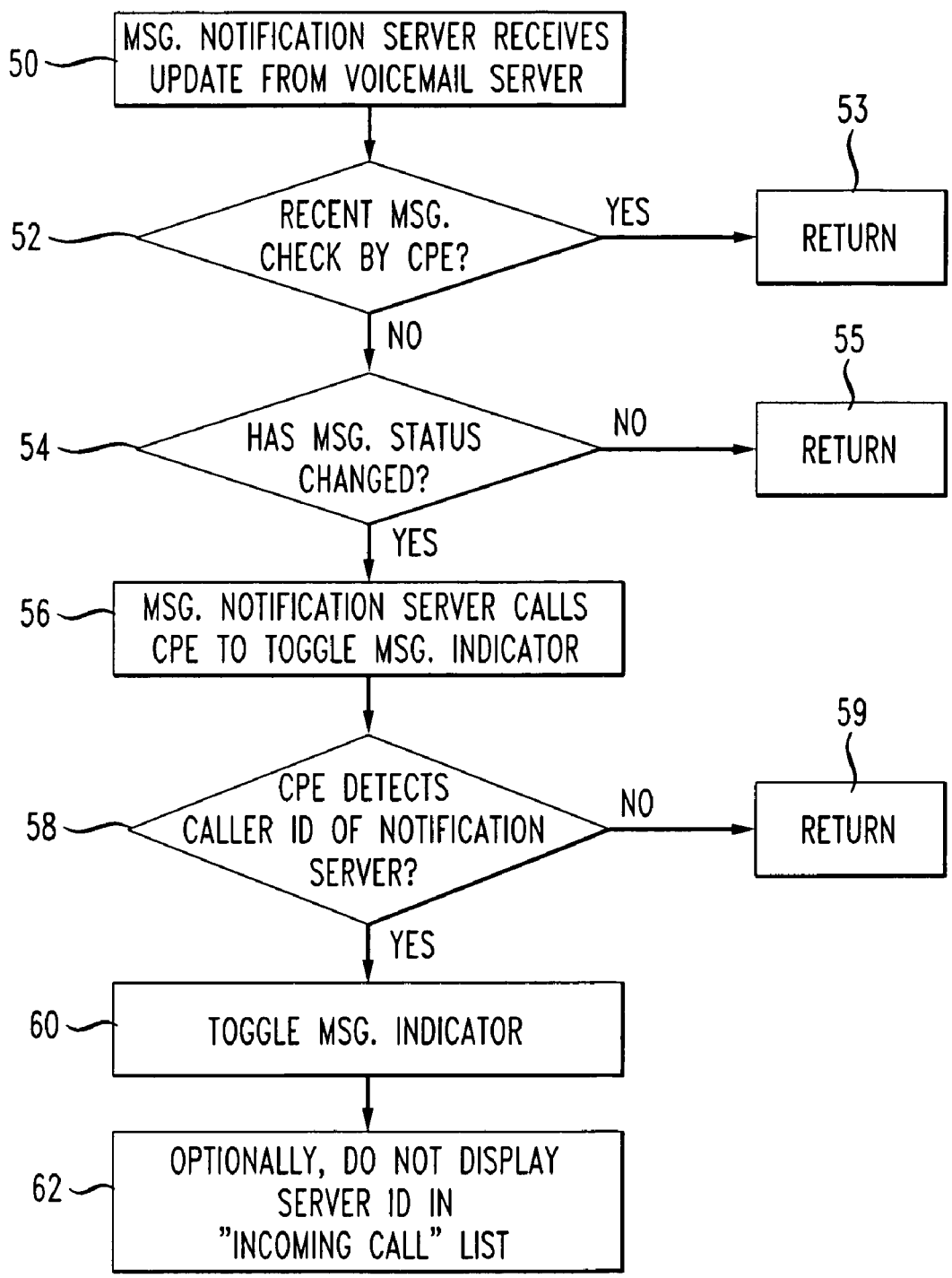
FIG. 4 illustrates a caller-ID feature implemented by the system of FIG. 2 according to another aspect of the present invention in which the caller-ID signal conveys message status.

FIG. 4 illustrates utilizing a caller-ID or other identification signal of message notification server 4 to toggle the status of a message waiting indicator where, at step 50, message notification server 4 receives an update from voicemail server 3 that a new message has been received. A routine of server 4, as indicated by step 52, determines whether CPE 5 has already checked for the new message. If affirmative, server 4 returns to a start state 53. If negative, the message notification server 4 checks, at step 54, to determine whether the message status of CPE 5's mailbox has changed from a prior state. If negative, server 4 returns to start state 55. If affirmative, the message notification server 4, at step 56, calls CPE 5. Upon detection at step 58 of the caller-ID of notification server 4, controller 8 at step 60 sets/resets the message indicator. This could be either a simple toggle, or a first unique caller-ID may be used to set the indicator and a second unique caller-ID may be used to reset the indicator. Note that this process of setting/resetting the CPE message indicator based on caller-ID is also applicable to caller-ID detection of an incoming call-waiting call. As previously indicated, the indicator may be audio, visual, or a combination thereof.

In a CPE device 5 that displays a caller-ID list, in accordance with another feature of the invention, controller 8 excludes from the caller-ID list those telephone numbers associated with notification server 4. In the case where multiple caller-IDs are associated with multiple sub-mailboxes, as shown in FIG. 5, controller 8 may exclude all such multiple caller-IDs from the subscriber's caller-ID list so that only those incoming calls emanating from non-voicemail server 4 are displayed.

Figure 5:
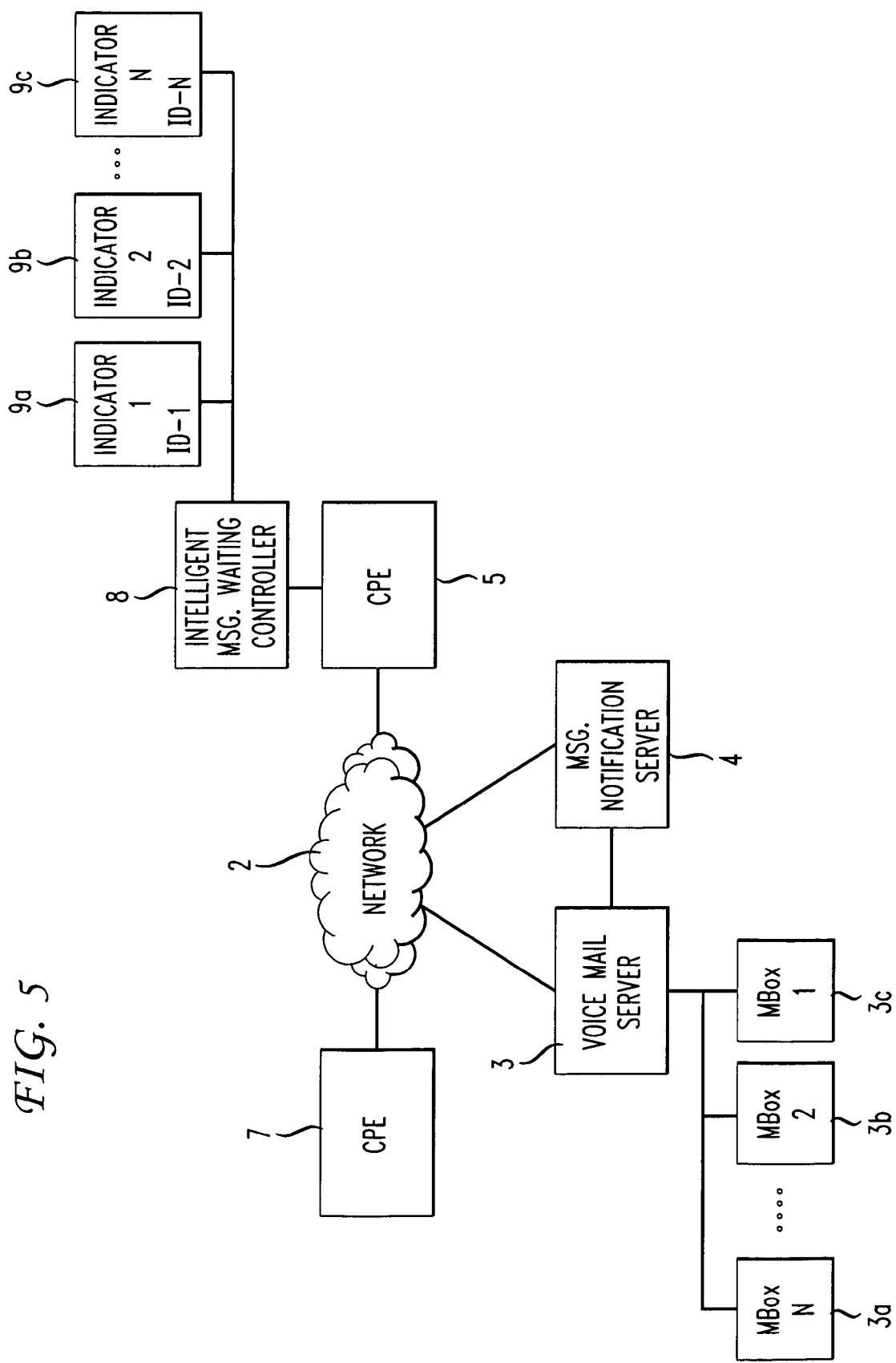
FIG. 5 depicts a telephone network and intelligent voice messaging controller utilizing multiple sub-mailboxes associated with a single telephone line according to yet another aspect of the invention.

FIG. 5 illustrates an embodiment of the invention having multiple sub-mailboxes 3a, 3b, and 3c assigned to a single telephone line, as well as multiple corresponding indicators 9a, 9b, and 9c that may be separately and individually toggled in response to the controller's detection of an associated caller-ID. To implement this feature on the network side, voicemail server 3 is partitioned in a conventional way to provide separately accessible storage regions associated with the sub-mailboxes 3a, 3b, and 3c. In response to telephone keypad or voice commands, an incoming caller's voice message is directed to a respective one of the sub-mailboxes. Message notification server 4 receives separate message status information for each of the sub-mailboxes. In one embodiment, server 4 has a series of unique 8YY numbers for incoming calls and a series of unique CPN/ANI numbers for outbound calls. This way, respective ID codes are associated with the individual sub-mailboxes when the CPE 5 contacts server 4 and when the server 4 calls the CPE 5. When server 4 receives message update information, the appropriate ID information may signify a new message in a sub-mailbox. For example, when server 4 rings back CPE 5, it uses the unique CPN/ANI number, e.g., a unique caller ID of each mailbox having a new message. As a default, CPE 5 calls a primary partition to the notification server to get messages. Server 4 may also ringback CPE 5 multiple times using different caller-IDs in a series of caller-IDs to indicate messages in each of multiple sub-mailboxes.

On the subscriber's side, intelligent controller 8 may detect any one of the unique multiple IDs in the series to toggle a respective indicator 9a, 9b, or 9c. Each of the indicators 9a, 9b, and 9c may comprise a "blinking" light emitting diode to indicate a new message. The indicators 9a, 9b and 9c may also have an audio indicator, in addition to a visual indicator, to obviate the subscriber's line-of-sight need to check the presence of messages. The audio indicator may emit the same or respective unique tones for each mailbox or sub-mailbox, or a different tone or tones to indicate new voicemail messages.

The foregoing description sets forth preferred or illustrative embodiments of the invention. Variations and adaptations may be made by those skilled in the art without departing from the scope of the invention, as set forth by the appended claims.

The invention claimed is:

1. In a telephone network that includes a voicemail server that stores messages and a message notification server that notifies a subscriber device of a message stored in the voicemail server by initiating a voicemail status call to the subscriber, the improvement comprising:

at least one unique caller-ID number associated with the status of messages at said voicemail server for that subscriber, and a controller responsive to the subscriber device to transmit the at least one unique caller-ID for that subscriber during the voicemail status call, according to the status of messages for that subscriber at said voicemail server, the at least one unique caller-ID number including a first unique caller-ID number transmitted when a new voicemail message is present for the subscriber and a second unique caller-ID number transmitted when no new voicemail message is present for the subscriber.

2. The improvement of claim 1, wherein the voicemail server includes multiple sub-mailboxes assigned to a single telephone line of a single subscriber, each sub-mailbox having a unique indicator for display on the subscriber device so as to identify which sub-mailbox has received a new voicemail message.

* * * * *